United States Patent [19]

Iwabuchi

[11] Patent Number: 5,283,705
[45] Date of Patent: Feb. 1, 1994

[54] HEAD RETRACTING MECHANISM FOR A MAGNETIC DISK DRIVE

[75] Inventor: Masanori Iwabuchi, Ibaragi, Japan
[73] Assignee: NEC Corporation, Tokyo, Japan
[21] Appl. No.: 899,848
[22] Filed: Jun. 17, 1992

[30] Foreign Application Priority Data

Jun. 17, 1991 [JP] Japan .................................. 3-144363

[51] Int. Cl.⁵ ............................................. G11B 21/02
[52] U.S. Cl. ..................................................... 360/105
[58] Field of Search ......................................... 360/105

[56] References Cited

U.S. PATENT DOCUMENTS

| | | | |
|---|---|---|---|
| 4,703,376 | 10/1987 | Edwards | 360/105 |
| 5,148,339 | 9/1992 | Yoshida | 360/105 |
| 5,189,576 | 2/1993 | Morehouse et al. | 360/105 |

Primary Examiner—Richard E. Gluck
Attorney, Agent, or Firm—Sughrue, Mion, Zinn, Macpeak & Seas

[57] ABSTRACT

A magnetic disk drive having a rotary positioning mechanism which positions a magnetic head relative to a recording medium in a rotary motion. A suspension arm supports the head at the top thereof and is movable parallel with the surface of the medium in a rotary motion. As the suspension arm is moved toward the outer edge of the medium, it abuts against and urges the side of a lifter. As a result, the lifter is rotated about a pivot to lift the suspension arm with a lug extending out from the side thereof. The magnetic disk drive prevents the head from sticking to the medium, reduces the power consumption of motors, increases the resistivity to shocks and impacts during transport, and positions the head accurately at all times.

5 Claims, 6 Drawing Sheets

HEAD RETRACTING MECHANISM FOR A MAGNETIC DISK DRIVE

BACKGROUND OF THE INVENTION

The present invention relates to a magnetic disk drive having a positioning mechanism of the type positioning a magnetic head relative to a recording medium in a rotaty motion, i.e., a so-called rotary positioning mechanism.

A magnetic disk drive of the type described is extensively used with a computer, word processor or similar electronic data processing equipment as a storage. There is an increasing demand for a magnetic disk drive capable of recording data in high density on a recording medium implemented as a disk. To meet this demand, it has been customary to increase the accuracy of the disk surface and to reduce the floating of the head above the disk. This, however, brings about a problem that the head is apt to sticks to the disk. In the light of this, a great current may be applied to a spindle motor which drives the disk or a voice coil motor which drives the head to thereby increase the driving force of the motor, as has been customary in the art. However, the great current for separating the head from the disk increases the required power and, moreover, often scratches the head and/or the disk since it forcibly separates the former from the latter.

On the other hand, a magnetic disk drive applicable to a lap-top type computer is powered by a battery. The prerequisite with this kind of magnetic disk drive is that it consumes a minimum of power and withstands shocks and impacts while being transported. Regarding the shocks and impacts, it is a common practice to increase the force which urges the head against the disk, so that the head may be prevented from hitting against the disk. The problem with this scheme is that the friction acting between the head and the disk increases to aggravate the power consumption of the spindle motor at the beginning of rotation of the disk. As a result, such a magnetic disk drive is not practicable with a lap-top computer. The head may be loaded onto and unloaded from the disk by mechanical means using a link, as proposed in the past. The mechanical head loading and unloading means, however, has a complicated and expensive structure and cannot be incorporated in a miniature magnetic disk drive. Further, the disk may be provided with a slant adjacent to the outer edge thereof to allow a suspension arm supporting the head to rise along the slant, as also proposed in the art. Such an implementation has a drawback that since the head moves obliquely relative to the disk, it cannot be accurately positioned relative to the disk.

SUMMARY OF THE INVENTION

It is therefore an object of the present invention to provide a magnetic disk drive which prevents a magnetic head thereof from sticking to a recording medium.

It is another object of the present invention to provide a magnetic disk drive which consumes a minimum of power.

It is another object of the present invention to provide a magnetic disk drive which desirably withstands shocks and impacts while being transported.

It is another object of the present invention to provide a magnetic disk drive capable of positioning a magnetic head thereof accurately at all times.

A magnetic disk drive for recording and reproducing data from at least one surface of a spinning recording medium by a magnetic head of the present invention comprises a suspension arm supporting the magnetic head at the tip thereof and movable in a rotary motion parallel with the surface of the recording medium toward and away from the outer edge of the medium, and a lifter movable in a rotary motion by being urged by the suspension arm when the arm is moved toward the outer edge of the recording medium, thereby lifting the arm.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
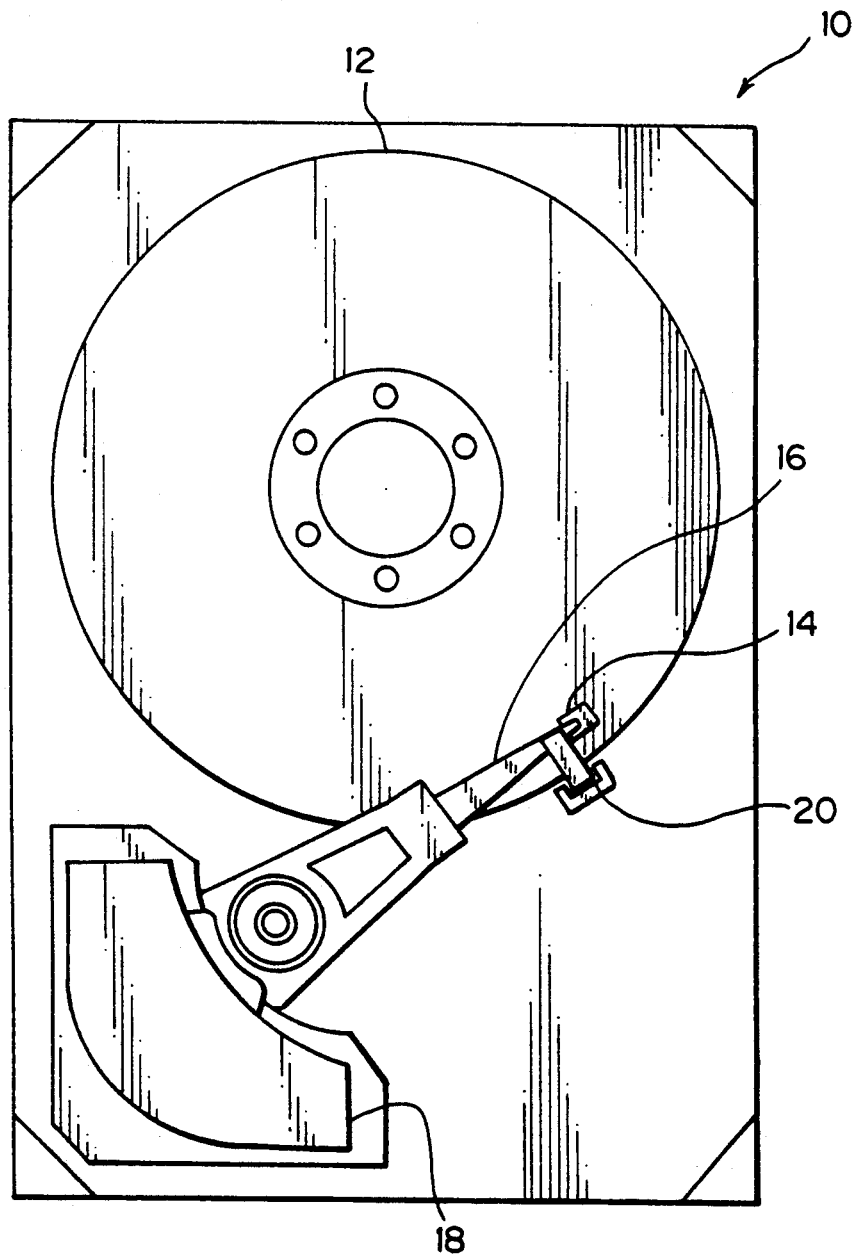
FIG. 1 is a plan view of a magnetic disk drive embodying the present invention.
Figure 2:
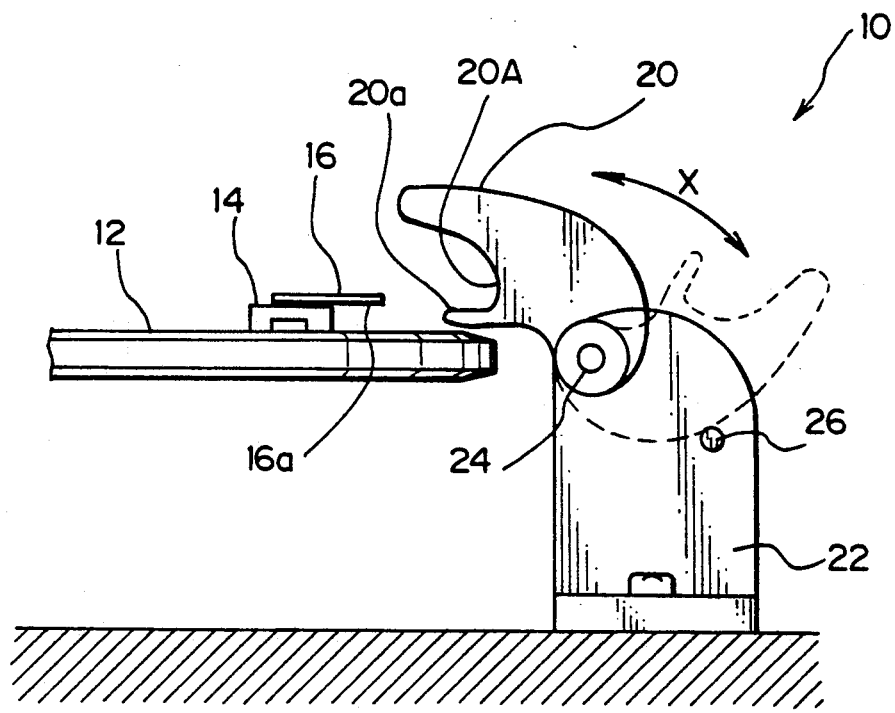
FIG. 2 is a fragmentary front view of the embodiment.
Figure 3:
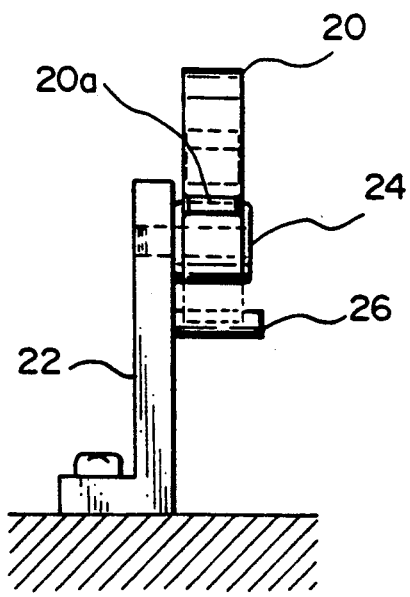
FIG. 3 is a side elevation of the embodiment.

Referring to FIG. 1 of the drawings, a magnetic disk drive embodying the present invention is shown and generally designated by the reference numeral 10. As shown, the magnetic disk drive 10 has a magnetic head 14 for recording and reproducing data from a magnetic disk or similar spinning recording medium 12. A suspension arm 16 supports the head 14 at the tip thereof and is driven by a voice coil motor 18 in a rotary motion parallel with the surface of the medium 12. A lifter 20 is positioned such that as the suspension arm 16 is moved toward the outer edge of the medium 12, it abuts against and urges the side of the lifter 20. As shown in FIGS. 2 and 3, the lifter 20 is held by a support member 22 having a stop 26. When the suspension arm 16 urges the side 20A of the lifter 20 as mentioned above, the lifter 20 is rotated about a pivot 24 provided on the support member 22 in a direction indicated by an arrow X, FIG. 2. As a result, a lug or jaw 20a extending out from the side 20A of the lifter 20 lifts the suspension arm 16 in contact with the underside 16a of the latter.

Figure 4A:
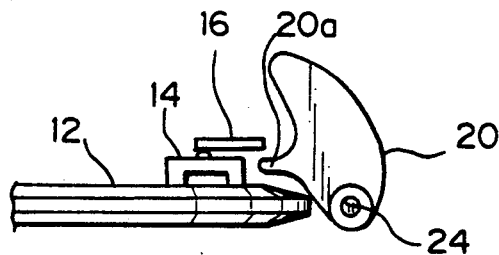
FIGS. 4A–4E are views demonstrating the operation of the embodiment.
Figure 4B:
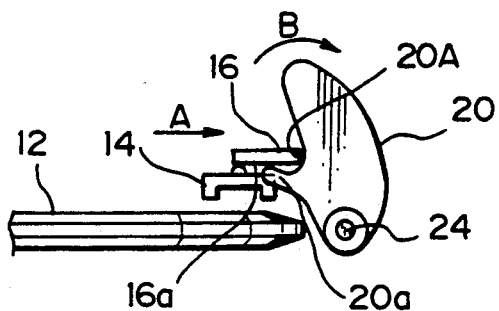
Figure 4C:
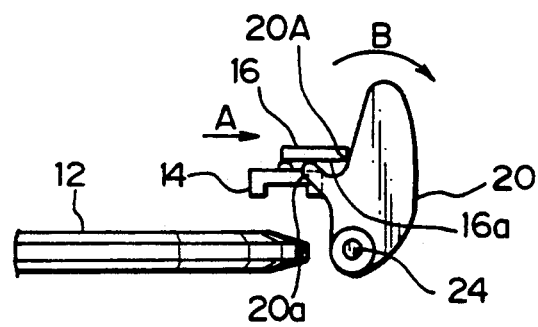
Figure 4D:
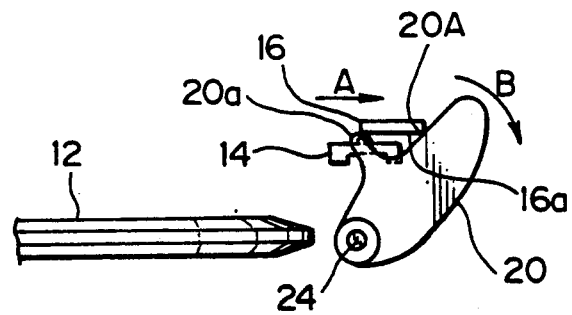
Figure 4E:
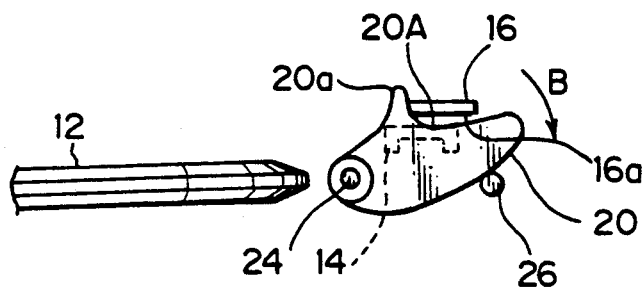

Specifically, before the suspension arm 16 begins to move toward the outer edge of the medium 12, it is spaced apart from the lifter 20, as shown in FIG. 4A. In this condition, the head 14 is freely movable at a distance from the medium 12, recording or reproducing data in or out of the medium 12. Assume that the suspension arm 16 is moved toward the outer edge of the medium 12, as indicated by an arrow A in FIG. 4B. Then, the suspension arm 16 abuts against and urges the side 20A of the lifter 20 with the result that the lifter 20 is rotated about the pivot 24, as indicated by an arrow B in FIG. 4B. Therefore, the jaw 20a extending from the side 20A of the lifter 20 abuts against the underside 16a of the suspension arm 16. As the suspension arm 16 is further moved in the direction A, the jaw 20a of the lifter 20 raises the underside 16a of the lifter 16, as shown in FIGS. 4C and 4D. At the same time, the suspension arm 16 is moved outwardly beyond the jaw 20a. The suspension arm 16 is further moved outwardly until it leaves the jaw 20a and rests on the lifter 20 by abutting against the stop 26 of the support member 22, as shown in FIG. 4E. In the condition shown in FIG. 4E, the jaw 20a prevents the suspension arm 16 from moving to the left, so that the head 14 is prevented from returning to the medium 12 despite vibration or shock. To load the head 14 onto the medium 12, the magnetic disk drive 10 will be operated in a sequence opposite to the above-described sequence.

Figure 5:
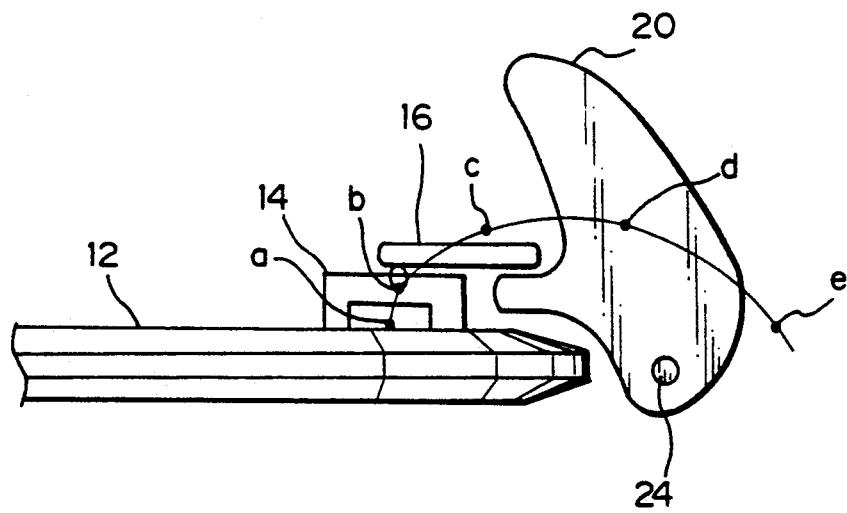
FIG. 5 is a view representative of the locus of a gap between a magnetic head and a disk particular to the embodiment.

As shown in FIG. 5, the gap between the head 14 and the medium 12 moves along a locus which resembles an arc. In FIG. 5, the positions of the gap between the head 14 and the medium 12 corresponding to FIGS. 4A, 4B, 4C, 4D and 4E are labeled a, b, c, d and e, respectively. The head 14 moves substantially perpendicular to the medium 12 at the time when it leaves or contacts the medium 12.

Figure 6:
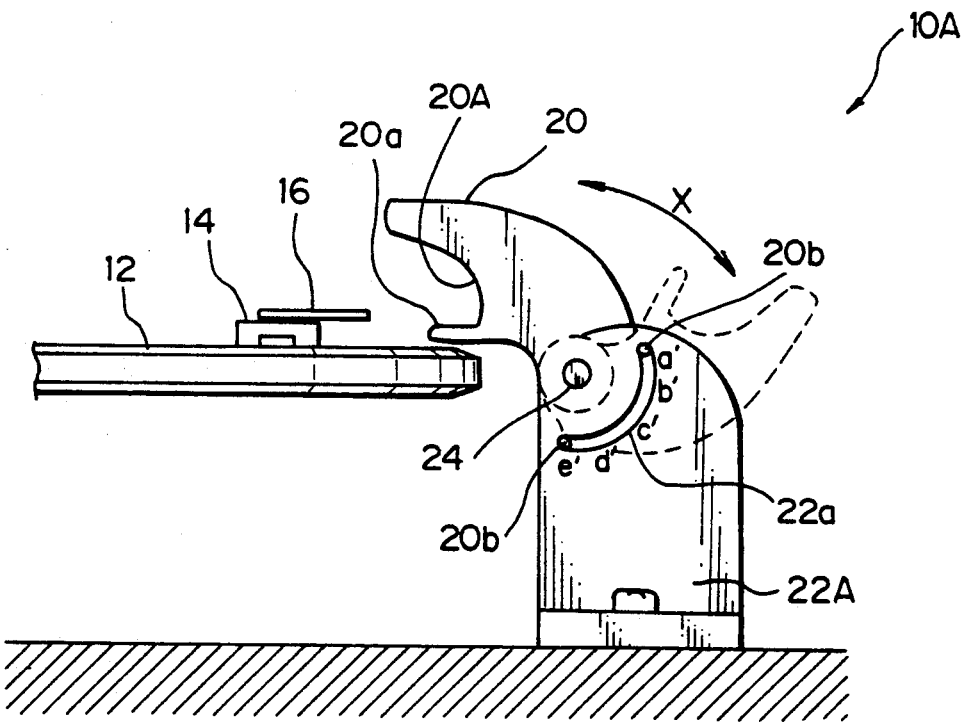
FIG. 6 is a fragmentary front view showing an alternative embodiment of the present invention.
Figure 7:
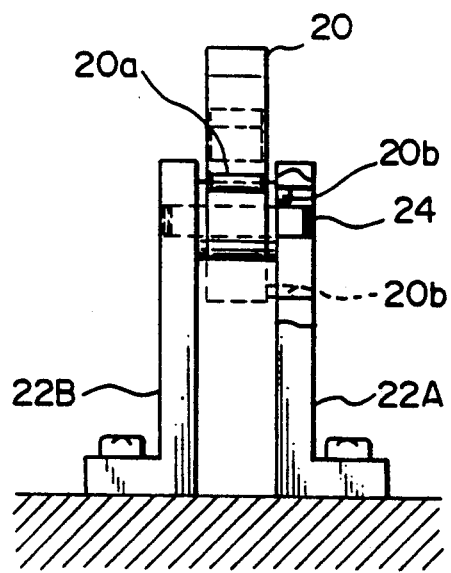
FIG. 7 is a fragmentary side elevation of the embodiment shown in FIG. 6.

Referring to FIGS. 6 and 7, an alternative embodiment of the present invention will be described. In the figures, the same or similar constituent parts are designated by like reference numerals, and redundant description will be avoided for simplicity. As shown, the magnetic disk drive, generally 10A, has the lifter 20 which is supported by a pair of support members 22A and 22B. A slide member 20b extends out from the lifter 20 and is slidably received in an arcuate guide slot 22a formed through the support member 22A. In operation, as the lifter 20A is moved from the position of FIG. 4A to the position of FIG. 4E, the slide member 20b moves along the guide slot 22a from the uppermost position a' to the lowermost position e' by way of intervening positions b', c' and d'. At the position e', the slide member 20b abuts against the lower end of the guide slot 22a. The positions a', b', c', d' and e' correspond to FIGS. 4A, 4B, 4C, 4D and 4E, respectively.

Figure 8:
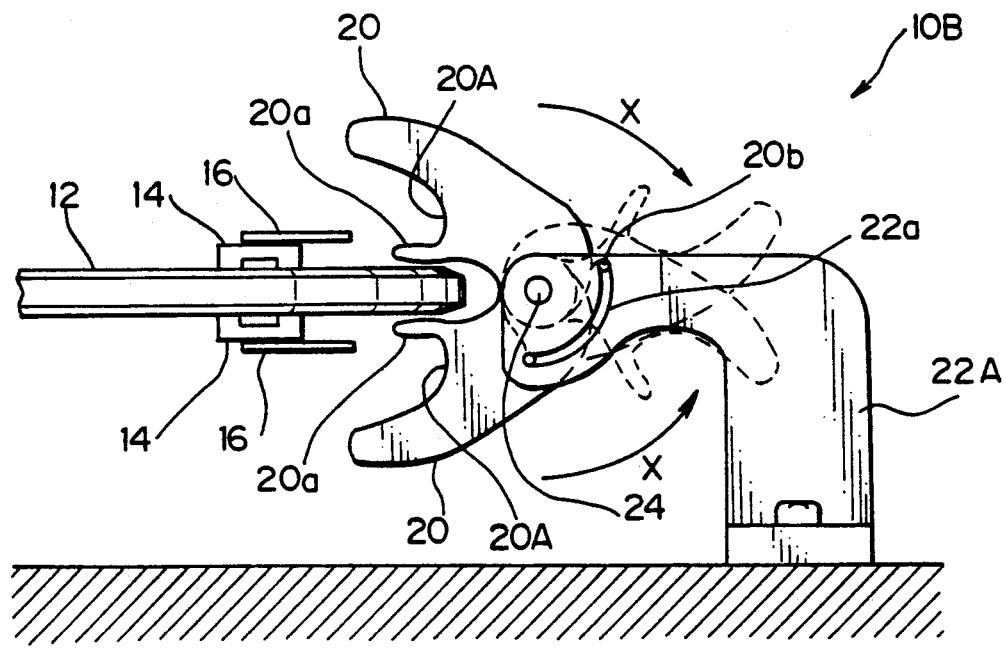
FIG. 8 is a front view showing another alternative embodiment of the present invention.
Figure 9:
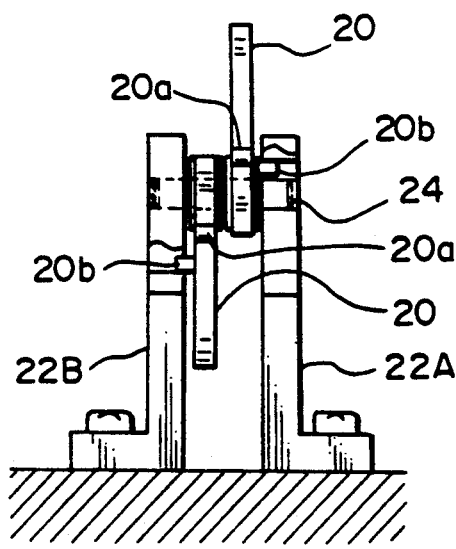
FIG. 9 is a fragmentary side elevation of the embodiment shown in FIG. 8.

FIGS. 8 and 9 show another alternative embodiment of the present invention. As shown, the magnetic disk drive, generally 10B, has the head 14 at both sides of the medium 12. Specifically, the magnetic disk drive 10B is a modification of the above disk drive 10A in that the suspension arm 16 and lifter 20 are associated with each of the two heads 14. The operation of the disk drive 10B is essentially the same as that of the disk drive 10A and, therefore, will not be described to avoid redundancy.

In summary, it will be seen that the present invention provides a magnetic disk drive which prevents a magnetic head thereof from sticking to a recording medium, reduces the power consumption of motors, enhances the resistivity to shocks and impacts during transport, and positions the head accurately at all times.

Various modifications will become possible for those skilled in the art after receiving the teachings of the present disclosure without departing from the scope thereof.

What is claimed is:

1. A magnetic disk drive for recording and reproducing data from at least one surface of a spinning recording medium by a magnetic head, comprising:
    a suspension arm supporting the magnetic head at the tip thereof and movable in a rotary motion parallel with the surface of the recording medium toward and away from the outer edge of said recording medium; and
    a lifter movable in a rotary motion by being urged by said suspension arm when said suspension arm is moved toward the outer edge of the recording medium, thereby lifting said suspension arm.

2. A magnetic disk drive as claimed in claim 1, further comprising a support member supporting said lifter such that said lifter is rotatable about a pivot.

3. A magnetic disk drive as claimed in claim 2, wherein said lifter comprises a side to be urged by said suspension arm when said suspension arm is moved toward the outer edge of the recording medium, and a lug extending out in the vicinity of said side for lifting said suspension arm.

4. A magnetic disk drive as claimed in claim 3, further comprising stop means for stopping the rotary motion of said lifter.

5. A magnetic disk drive as claimed in claim 3, wherein said lifter comprises a slide member fixed to said lifter, said support member comprising a guide slot receiving said slide member to allow said slide member to slide along said guide slot.

* * * * *